(12) United States Patent
Garotte et al.

(10) Patent No.: US 11,338,707 B2
(45) Date of Patent: May 24, 2022

(54) VEHICLE SEAT WITH VERTICAL PIVOTING MOVEMENT

(71) Applicant: FAURECIA Sièges d'Automobile, Nanterre (FR)

(72) Inventors: Gérald Garotte, Bellou-en-Houlme (FR); Bertrand Touzet, Pollhagen (DE)

(73) Assignee: FAURECIA Sièges d'Automobile, Nanterre (FR)

( * ) Notice: Subject to any disclaimer, the term of this patent is extended or adjusted under 35 U.S.C. 154(b) by 157 days.

(21) Appl. No.: 16/577,576

(22) Filed: Sep. 20, 2019

(65) Prior Publication Data

US 2020/0101871 A1   Apr. 2, 2020

(30) Foreign Application Priority Data

Sep. 27, 2018   (FR) ...................... 18 58894

(51) Int. Cl.
*B60N 2/14*   (2006.01)
*B60N 2/06*   (2006.01)
*B60N 2/42*   (2006.01)
*B60N 2/02*   (2006.01)
*F16D 3/04*   (2006.01)

(52) U.S. Cl.
CPC .......... *B60N 2/146* (2013.01); *B60N 2/0232* (2013.01); *B60N 2/06* (2013.01); *B60N 2/43* (2013.01); *F16D 3/04* (2013.01)

(58) Field of Classification Search
CPC . B60N 2/146; B60N 2/06; B60N 2/14; B60N 2/0232; B60N 2/43; F16D 3/04
See application file for complete search history.

(56) References Cited

U.S. PATENT DOCUMENTS

| 4,844,543 | A | * | 7/1989 | Ochiai | ...................... A47C 3/18 |
| | | | | | 297/344.26 |
| 4,846,529 | A | | 7/1989 | Tulley | |
| 7,644,989 | B2 | | 1/2010 | Baloche Faurecia | |
| 9,211,812 | B2 | * | 12/2015 | Haller | .................... B60N 2/015 |
| 10,500,988 | B1 | * | 12/2019 | Faruque | ................ B60N 2/146 |

FOREIGN PATENT DOCUMENTS

| FR | 2676690 | | 11/1992 | |
| FR | 2883812 | | 10/2006 | |
| FR | 2956623 | | 8/2011 | |
| JP | 09002112 | A * | 1/1997 | ............. B60N 2/146 |

\* cited by examiner

*Primary Examiner* — Milton Nelson, Jr.
(74) *Attorney, Agent, or Firm* — Barnes & Thornburg LLP

(57) ABSTRACT

A vehicle seat having a pivoting function about a vertical axis, the seat comprising a pivoting assembly) with a base, a rotating ring mounted on the base by means of a hinge mechanism interposed between the base and the rotating ring, a seating portion frame connected to the rotating ring, directly or via a raising mechanism and/or longitudinal rails, the hinge mechanism allowing rotation, about a vertical main axis, of the rotating ring relative to the base and blocking any substantial movement in the other degrees of freedom, namely the other two rotations and the three translations in an orthogonal reference system.

12 Claims, 6 Drawing Sheets

VEHICLE SEAT WITH VERTICAL PIVOTING MOVEMENT

PRIORITY CLAIM

This application claims priority to French Application No. FR 18 58894, filed Sep. 27, 2018, which is expressly incorporated by reference herein.

BACKGROUND

The present disclosure relates to seats, and particularly to vehicle seats. More particularly, the present disclosure relates to vehicle seats with pivoting movement about a vertical axis.

SUMMARY

According to the present disclosure, a vehicle seat has a pivoting function about a vertical axis.

In illustrative embodiments, the seat comprising a pivoting assembly which comprises a base configured to be connected to the floor of the vehicle directly or via longitudinal rails, a rotating ring mounted on the base by means of a hinge mechanism interposed between the base and the rotating ring, the seat further comprising a seating portion frame connected to the rotating ring, directly or via a raising mechanism and/or longitudinal rails, the hinge mechanism allowing rotation, about a vertical main axis (Z1), of the rotating ring relative to the base and preventing any substantial movement in the other degrees of freedom, namely the other two rotations and the three translations in an orthogonal reference system.

In illustrative embodiments, the hinge mechanism is mounted in a central area of the base, the hinge mechanism having at least one rest state in which it rotationally immobilizes the rotating ring relative to the base. The hinge mechanism comprises a first ring gear integral to one of the elements selected among the base and the rotating ring, and at least one second part having a toothed sector, connected to the other of the elements selected among the base and the rotating crown, which in the rest state is engaged with the first ring gear, the hinge mechanism allowing or driving, when so controlled, an angular displacement of the rotating ring relative to the base and in which the possible angular deflection is at least equal to 90° and in which the hinge mechanism is entirely contained in a cylinder 120 mm in diameter centered on the main axis (Z1).

In illustrative embodiments, the hinge mechanism is formed as a disc less than 120 mm in diameter, centered on Z1; the thickness of the disk, in other words the height of the cylinder (CC), is less than 100 mm, preferably less than 70 mm, even more preferably less than 40 mm. The hinge mechanism has a diameter less than 120 mm, preferably a diameter less than 100 mm, or even less than 80 mm. The possible angular deflection is at least 90°, preferably at least 180°, and even more preferably at least 360°; in some configurations it is possible to obtain a solution of multiple rotations.

In illustrative embodiments, there may further be provided an annular guide device with a plurality of rolling elements (5) interposed between the base and the rotating ring and located at a distance (R5) from the main axis. The rolling elements, farther from the axis than the hinge mechanism, thus provide a significant lever arm to counteract tilting forces exerted on the seat, particularly the application of a horizontal force on the top of the seat backrest.

In illustrative embodiments, the rolling elements may be balls. As such balls are standard items, a cost-effective solution for an annular guide of large diameter is obtained, if necessary using a ball guide cage.

In illustrative embodiments, the rolling elements may be rollers. The rollers are each mounted on a shaft fixed either to the base or to the rotating ring, and a play compensation system may be provided which eliminates any risk of noise.

In illustrative embodiments, the balls work with compression along the vertical axis. The ball guide system can therefore be very simple.

In illustrative embodiments, the balls allow eccentric movement of the axis of the rotating ring, which allows using a hinge having eccentric movement with a very simple ball guide system.

In illustrative embodiments, the hinge mechanism may be of the hypocycloid continuous type with eccentric cam, and the pivoting assembly further comprises an electric motor connected to the eccentric cam and configured for selectively rotating the eccentric cam. Such a hypocycloid hinge mechanism is inexpensive, because they are produced in large quantities for backrest hinges having motorized adjustment.

In illustrative embodiments, the gearmotor can be connected to the hinge mechanism by a Bowden cable. This gives great freedom for positioning to the gearmotor within the seat environment.

In illustrative embodiments, the motor is positioned above the hinge mechanism and is rigid with the rotating ring. This thus provides a solution with good compactness, facilitating its integration as a pivoting module while preserving the storage space under the seat.

In illustrative embodiments, the motor is positioned under the hinge mechanism, and is rigid with the base. The seating portion can thus have a moderate thickness, the motor being in a technical area under the hinge mechanism.

In illustrative embodiments, the hypocycloid hinge mechanism comprises a first flange in which is formed the first ring gear which comprises N1 teeth and a second flange in which is formed a second ring gear which comprises N2 teeth, the first and second ring gears being constantly engaged with at least one circle sector due to the effect of an eccentric control cam, the first and second ring gears forming a hypocycloid interface in which the center of the second rotating ring is displaced relative to the center of the first ring gear when the control cam rotates. The offset of the center of the second ring remains limited however, typically <2 mm relative to the main axis. This forms a simple and reliable solution for a adjustment mechanism that is continuous, meaning not incremental.

In illustrative embodiments, the rotating ring main axis (Z2) of the rotating ring remains substantially parallel to the main axis (Z1), but changes according to hypocycloid kinematics with a distance to the main axis that is less than 2 mm.

In illustrative embodiments, the first flange is rigid with the base while the second flange is integral to the rotating ring.

In illustrative embodiments, a transmission based on the Oldham coupling principle is provided to compensate for the eccentric effect generated by the hypocycloid hinge mechanism with eccentric cam, the transmission based on the Oldham coupling principle being interposed between the hinge mechanism and the rotating ring. The seat can thus rotate in a perfectly circular motion with no unwanted eccentric or hypocycloid effect.

In illustrative embodiments, the hinge mechanism is non-reversible, in other words a large torque exerted between the first and second flanges cannot cause a relative movement of the first flange to the second flange, in the absence of rotation of the eccentric cam caused by rotation of the motor. Thus, when there are no commands to the motor, there is no pivoting of the seat even if torque is exerted on the seat.

In illustrative embodiments, the hinge mechanism may be of the discontinuous type with locking toothed parts, the hinge mechanism then being non-motorized, the seat then comprising an unlocking control lever that is operable by a seat user. This forms an inexpensive basic solution for providing a seat with a vertical pivoting function.

In illustrative embodiments, the hinge mechanism comprises a first flange in which is formed the first ring gear and a second flange in which are arranged guides adapted to receive and guide locking parts, the locking parts each having teeth which engage with the first ring gear in the rest state of the hinge mechanism and which are distanced from the first ring gear in the activated unlocked state of the hinge mechanism. Such a hinge mechanism is inexpensive, because they may be produced in large quantities for manually adjustable backrest hinges.

In illustrative embodiments, the first flange is integral to the base while the second flange is integral to the rotating ring.

In illustrative embodiments, there may also be provided an additional retention device in case of accident, with a first part integral to the base and a second part integral to the rotating ring, the first and second parts coming into contact with each other to prevent the rotating ring from rising in the event of an accident to the vehicle, the first and second parts being arranged at a distance (R7) from the axis of at least 200 mm. Such an auxiliary retention device makes it possible to maintain the cohesion of the seat even in the event of a major impact. It is noted that these first and second so-called anti-crash parts are not in contact with one another within the range of normal forces.

In illustrative embodiments, there is proposed a vehicle seat having a pivoting function about a vertical axis, the seat comprising a pivoting assembly which comprises:

a base configured to be connected to the floor (PL) of the vehicle directly or via longitudinal rails, a rotating ring mounted on the base by means of a hinge mechanism interposed between the base and the rotating ring, the seat further comprising a seating portion frame connected to the rotating ring, directly or via a raising mechanism and/or longitudinal rails, the hinge mechanism allowing rotation, about a vertical main axis (Z1), of the rotating ring relative to the base and preventing any substantial movement in the other degrees of freedom, namely the other two rotations and the three translations in an orthogonal reference system, characterized in that the hinge mechanism is mounted in a central area of the base, the hinge mechanism having at least one rest state in which it rotationally immobilizes the rotating ring relative to the base, the hinge mechanism comprising a first ring gear integral to one of the elements selected among the base and the rotating ring, and at least one second part having a toothed sector, connected to the other of the elements selected among the base and the rotating ring, which in the rest state is engaged with the first ring gear, the hinge mechanism allowing or driving, when so controlled through the medium of a drive shaft centered on the main axis Z1, an angular displacement of the rotating ring relative to the base and in which the possible angular deflection is at least equal to 90°, and in which the hinge mechanism comprises a drive shaft substantially centered on the main axis (Z1).

In illustrative embodiments, by substantially centered, it is meant that the drive shaft (otherwise called control shaft) is indeed centered on the main axis (Z1). Alternately, the drive shaft can have an axis which can be a bit spaced apart, but less than 3 mm away, and the axis of the control/drive shaft remains parallel to the main axis (Z1).

In illustrative embodiments, all the particular arrangements set forth above can also be combined with the instant centered drive shaft feature, in particular the hinge mechanism entirely contained in a 120 mm diameter cylinder centered on the main axis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 6:
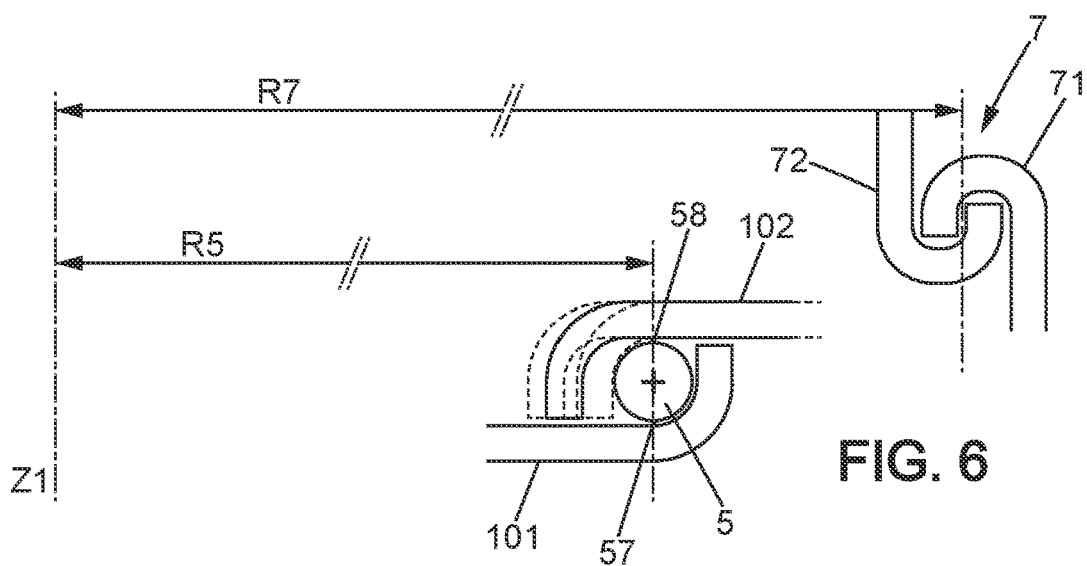
FIG. 6 is a detail view in vertical section of the rolling elements.
Figure 11:
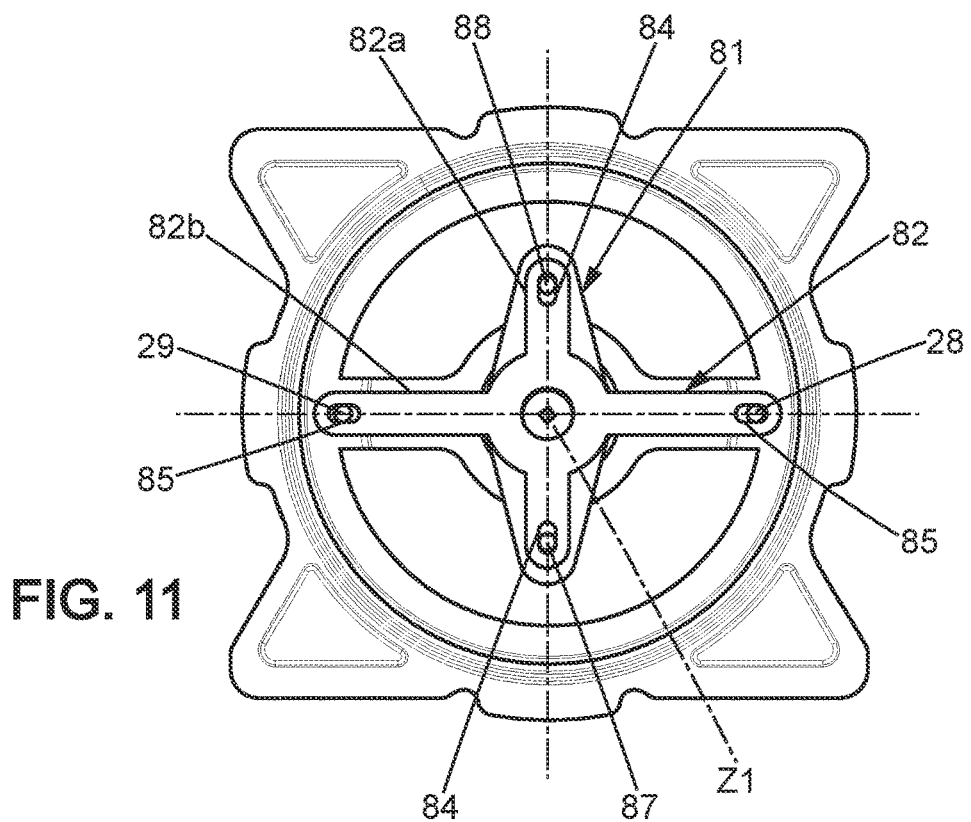
Figure 12:
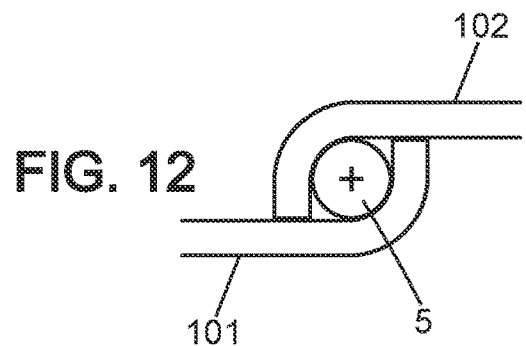

FIG. 11 more particularly illustrates a transmission based on the Oldham coupling principle, used in the third embodiment; and FIG. 12 is similar to FIG. 6 and shows a detail view in vertical section of the rolling elements, according to the third embodiment.

DETAILED DESCRIPTION

In the different figures, the same references designate identical or similar elements. For clarity, some elements are not necessarily represented to scale.

Figure 1:
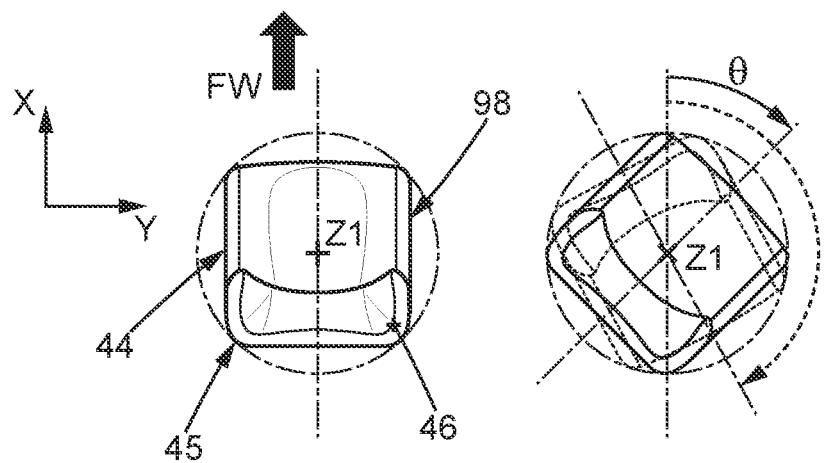
FIG. 1 is a general top view of two vehicle seats each equipped according to the present disclosure.
Figure 2:
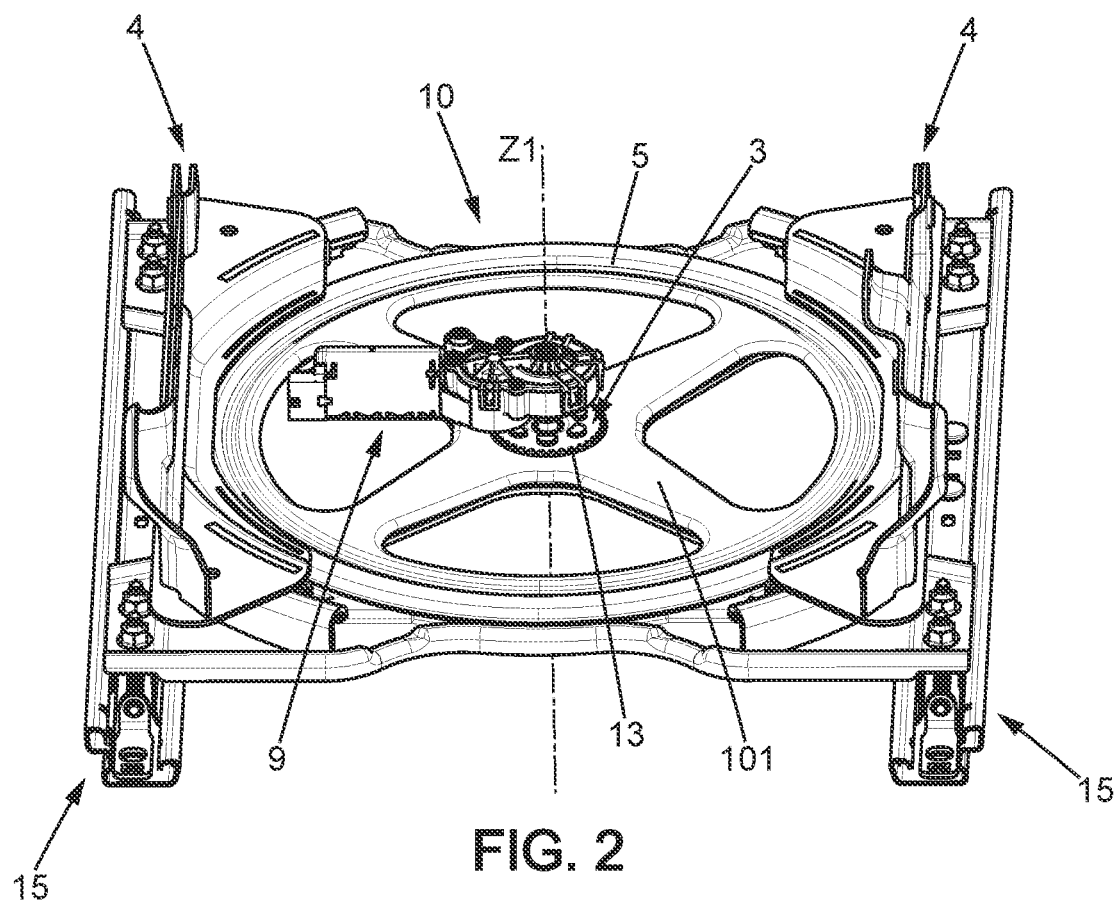
FIG. 2 is a partial perspective view of a pivoting module or assembly for a seat of FIG. 1.

In the text that follows, the term forward refers to the seat position where the seat is facing towards the front of the vehicle, in other words a person seated in the seat is oriented/facing towards the front of the vehicle (arrow FW in FIG. 1).

Such a seat with pivoting movement about a vertical axis may be used in the case where one wishes for the passengers of the vehicle, seated on seats which normally are all oriented in a forward direction, to be able to turn towards each other to discuss, play games, or engage in another activity in a more enjoyable manner.

A pivoting movement about a vertical axis can also be put to use for the function of accommodating a passenger; unlike the previous case, in this case the seat is turned towards the exterior of the vehicle.

In addition, in the context of more or less advanced autonomous driving situations using self-driving functions of the vehicle, the driver may prefer a seat position that is not directly facing the road.

Varied and very different seat orientations can thus prevail inside the vehicle interior.

A top view of two seats is represented in FIG. 1, the left one in a conventional position oriented strictly forward FW while the right one is illustrated with several different angular positions represented.

Figure 10:
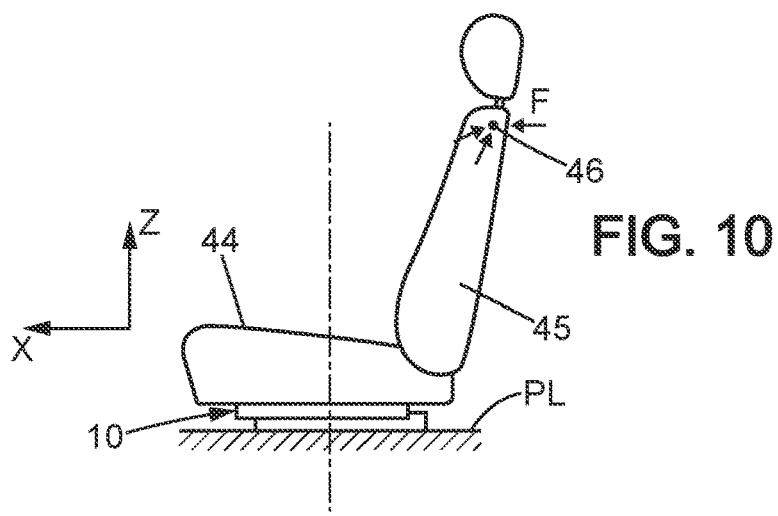
FIG. 10 is a schematic side view of a seat in accordance with the present disclosure.

A seat is schematically represented in FIG. 10, connected to the floor PL of the vehicle by means of a pivoting module 10 of axis Z1. The seat comprises a seat cushion 44 and a backrest 45. In the context of the present disclosure, the interest is in forces that can be applied to the top of the backrest denoted 46, in various and arbitrary directions, remembering to take into account cases where the vehicle is in an accident (crash resistance).

A main pivot axis is defined, denoted Z1. In the following, the conventional geometric reference system usually used in vehicles can also be used, in other words the longitudinal direction of axis X, the transverse direction of axis Y, and the vertical direction of axis Z.

According to the pivoting direction about the vertical axis, each angular position of the seat can be characterized by its orientation relative to the forward position, by means of angle $\theta$. Thus, $\theta=0$ represents a forward-facing seat, $\theta=90°$ represents a seat that has rotated a quarter-turn to the right, $\theta=180°$ represents a seat facing rearward, $\theta=270°$ represents a seat that has rotated three-quarters of a turn to the right (or equivalent to a quarter turn to the left). Of course, the occupant of the seat can adjust the angular position to a plurality of intermediate positions. According to certain embodiments, a complete rotation is possible or even several rotations, i.e. a multi-rotation configuration.

In the example illustrated in the figures, starting from the floor PL of the vehicle, the seat comprises a pair of longitudinal rails 15, a base 1 forming the base portion of a pivoting assembly 10, a rotating ring 2 forming the movable portion of the pivoting assembly, and a seating portion frame 4 mounted on the rotating ring and forming the supporting structure of the seating portion of the seat 44 on which the backrest 45 of the seat is mounted.

Figure 3:
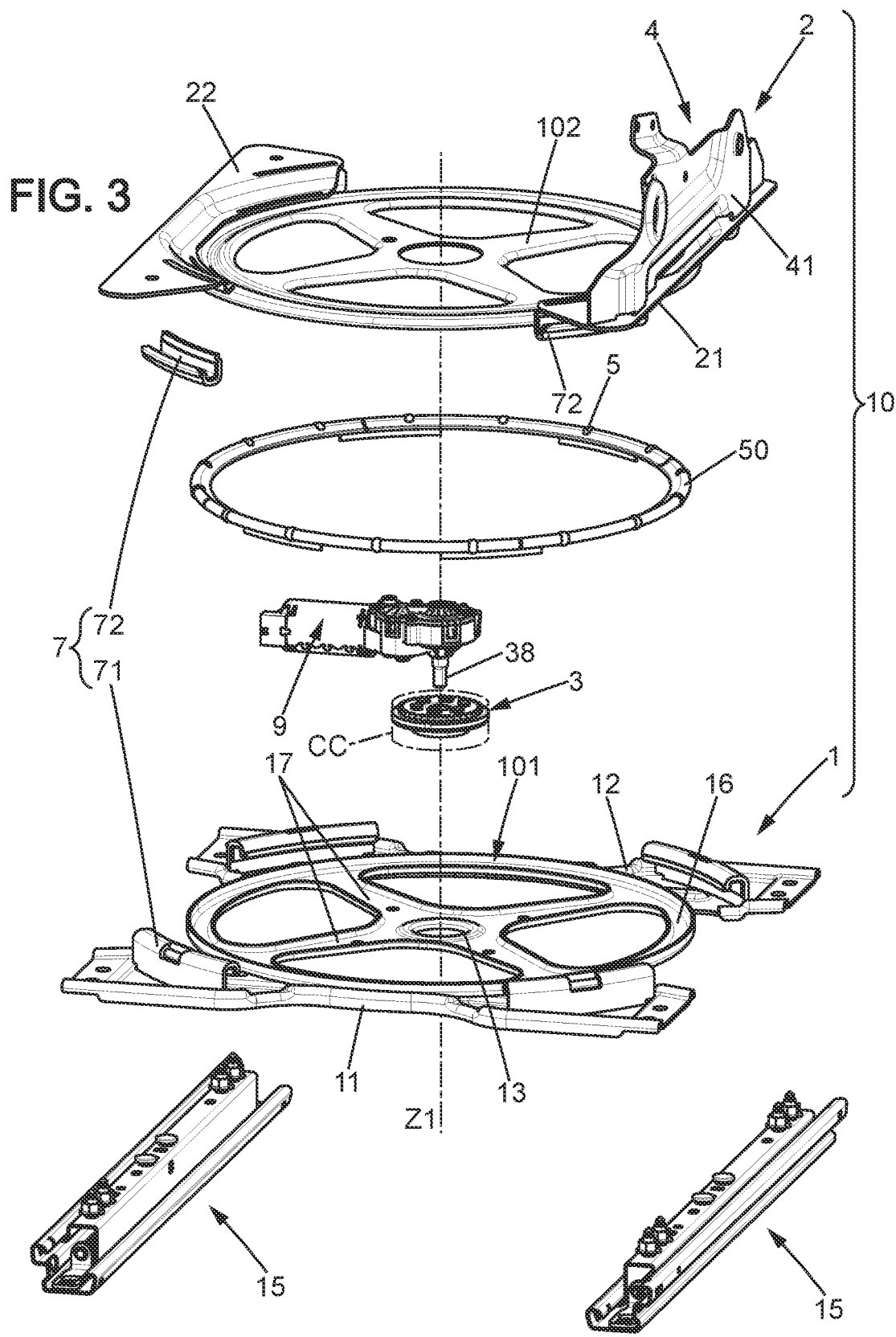
FIG. 3 is an exploded perspective view of a pivoting module or assembly fora seat of FIG. 1.
Figure 9:
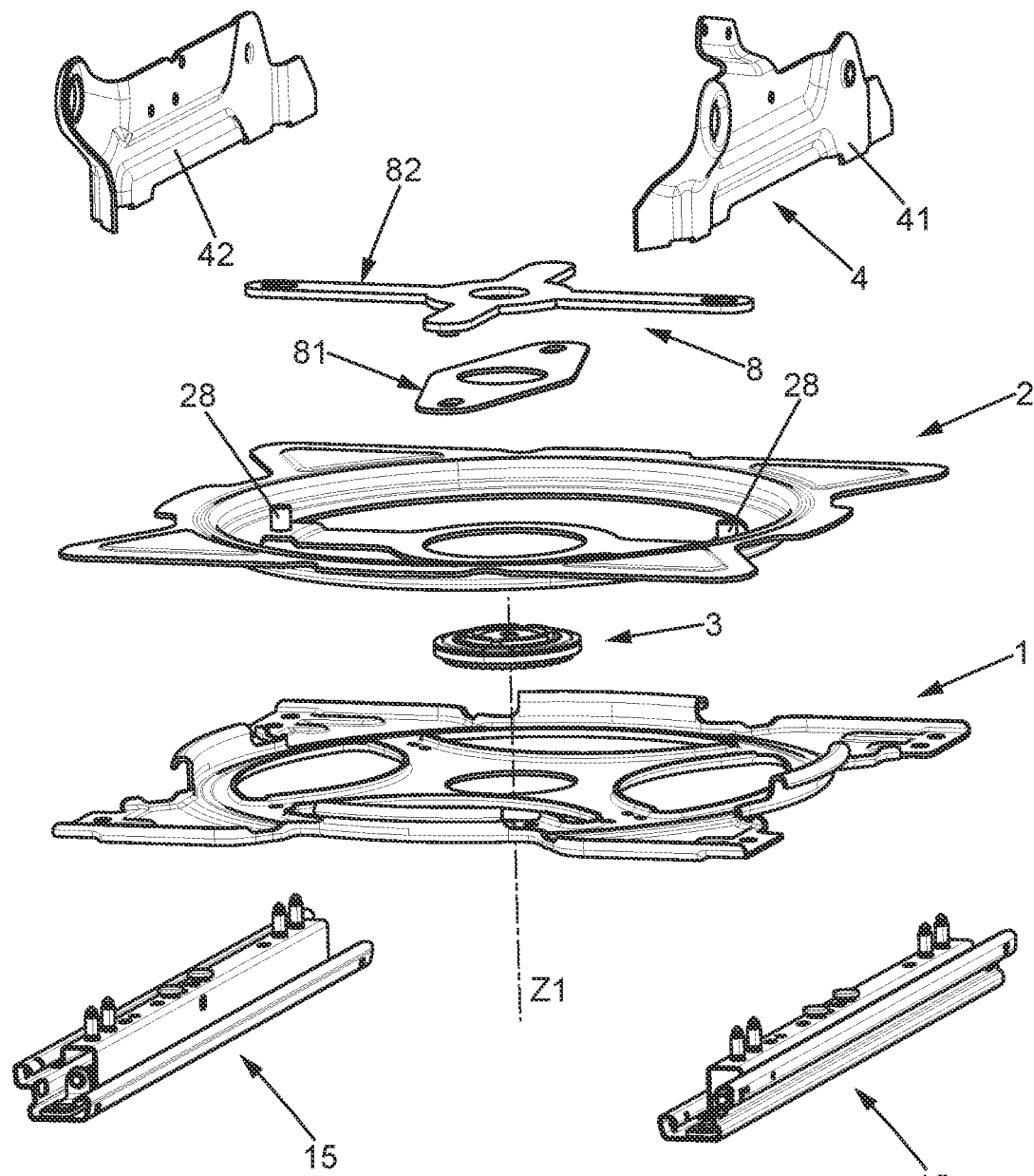
FIG. 9 is similar to FIG. 3 and shows an exploded perspective view of a pivoting module or assembly according to a third embodiment.

In FIG. 9, two lateral flanges 41,42 of the seating portion frame are represented; in FIG. 3, only the left side flange 41 of the seating portion frame is represented.

The possibility of a different assembly in a variant embodiment should be mentioned here, namely the pivoting assembly comprises a base directly fixed to the floor and the longitudinal rails are located above the rotating ring of the pivoting assembly, in other words said longitudinal adjustment rails are then embedded in the rotating portion and their orientation therefore varies according to the orientation of the vertical pivoting movement.

It should also be noted that it is possible to have a raising movement between the pivoting assembly and the seating portion frame.

According to the present disclosure, the pivoting assembly comprises a hinge mechanism denoted 3, which is functionally interposed between the base 1 of the pivoting assembly and the rotating ring 2 of the pivoting assembly. Hinge mechanism may be a mechanism derived from the hinge mechanisms used on a wide scale for the hinge for backrests to pivot relative to the seating portion of the backrest.

Such a hinge mechanism is formed as a disk of a diameter less than 120 mm centered on the main axis Z1; the thickness of the disk, in other words the height of the cylinder CC which contains the mechanism, is less than 100 mm, preferably less than 70 mm, even more preferably less than 40 mm. The hinge mechanism has a diameter less than 120 mm, preferably a diameter less than 100 mm or even less than 80 mm.

The hinge mechanism is therefore in a particularly compact form. The hinge mechanism is arranged centrally with respect to the base of the seat, in other words the hinge mechanism is mounted in a central area of the base, one of the reference axes of the hinge mechanism 3 corresponding to the aforementioned main axis Z1.

Two types of hinge mechanism are envisaged, namely a continuous hypocycloid hinge mechanism and a discontinuous hinge mechanism with locking toothed parts; we will return to these two cases in more detail further below.

The hinge mechanism allows a rotation of the rotating ring about the rotating ring main axis Z2 coincident with or close to the vertical main axis Z1, relative to the base. In particular, the rotation of the rotating ring is controlled by a drive shaft of the hinge mechanism. The drive shaft of the hinge mechanism can be manually operated or motorized.

The drive shaft is centered on the main axis Z1. At the same time, the hinge mechanism 3 prevents any substantial movement in the other degrees of freedom, namely the other two rotations (around X and around Y) and the three translations in the orthogonal reference system (namely translation along X translation along Y translation along Z).

In the example shown, longitudinal rails 15 each comprise a fixed profile integrally connected to the floor PL and a movable profile which can move along a direction parallel to X.

The base of the pivoting assembly is formed as a frame integrally mounted on and straddling the two movable profiles of the longitudinal rails. As for the base, it is a frame of folded sheet metal, where appropriate a mechanical welded structure.

The four corners of the frame can be used for the installation, optional in the sense of the disclosure, of an additional retention device in case of accident, which will be detailed further below.

According to one exemplary embodiment, the base may be formed by two crosspieces 11,12 which extend transversely between the two movable profiles of the longitudinal rails 15 and a central flange 101 integrally secured to the two crosspieces. The central flange 101 comprises a peripheral rim 16 centered on the main axis Z1, said rim forming a raceway for rolling elements which will be discussed further below. Furthermore, the central flange comprises a hub/bearing 13 intended to receive the hinge mechanism 3. In the example illustrated, the flange comprises spokes 17 which connect the central bearing hub 13 to the peripheral rim 16, but of course the flange could be solid, having reinforcing ribs etc. In the illustrated example, the base is made of metal, preferably steel, although the use of light alloy is not excluded. The use of composite materials, particularly fiber reinforced resins, is also possible for the base.

According to the first embodiment presented, the hinge mechanism installed in the central bearing of the base is a hypocycloid mechanism 3 with eccentric control cam 33.

Figure 4:
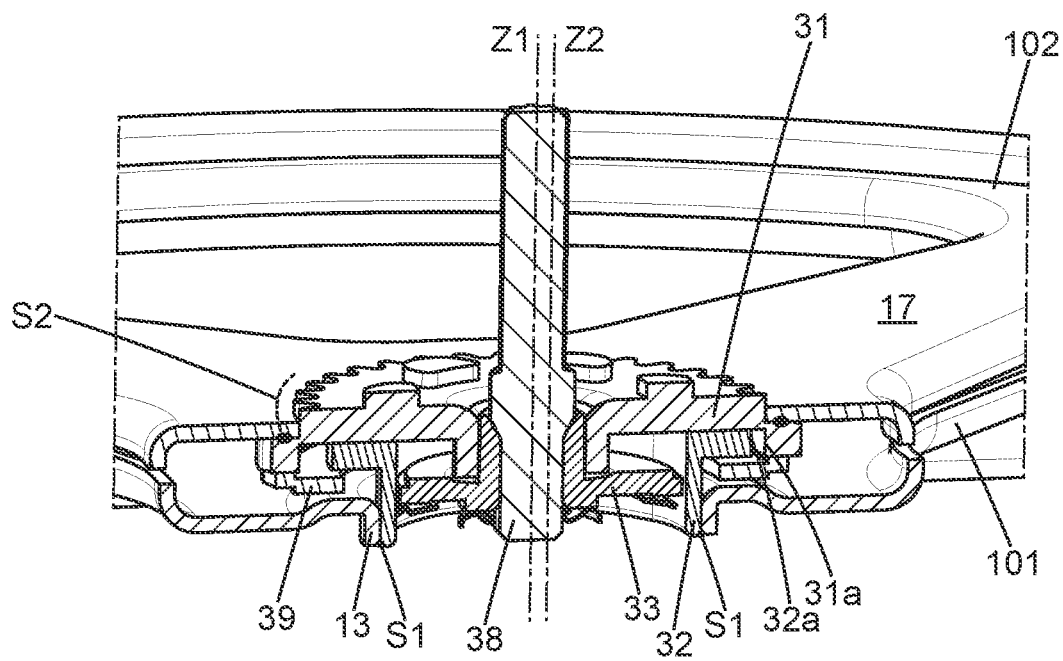
FIG. 4 is an axial sectional view of the hinge mechanism according to the first embodiment.
Figure 5:
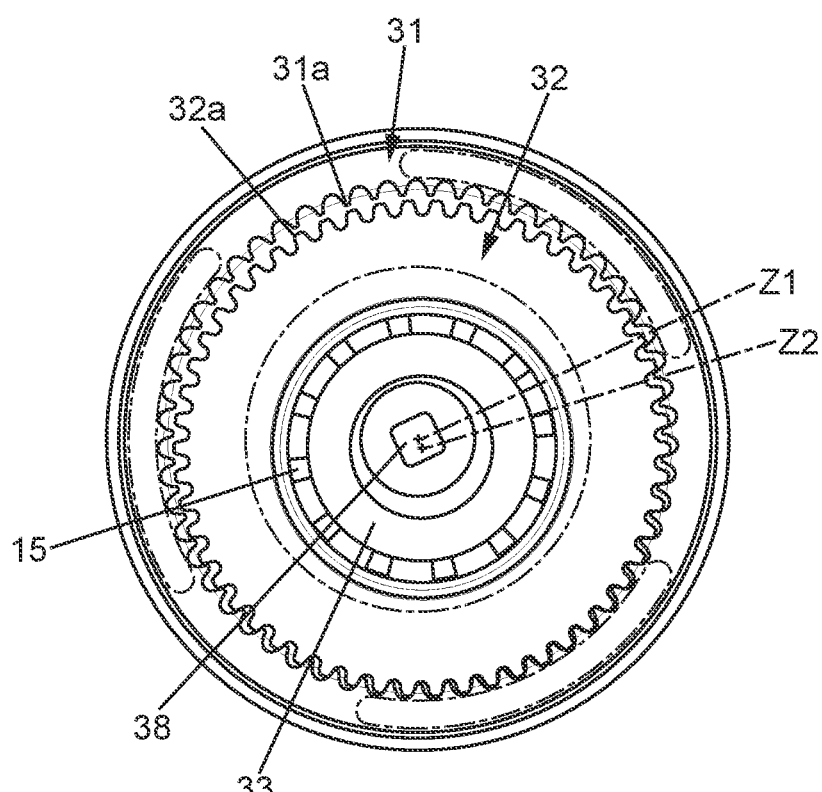
FIG. 5 is a transverse sectional view of the hinge mechanism according to a first embodiment, of the hypocycloid continuous type with an eccentric cam.

FIGS. 4 and 5 illustrate such a mechanism, respectively in axial section and in transverse section.

The hypocycloid hinge mechanism comprises a first flange 31 in which is formed a first ring gear 31a which comprises N1 teeth and a second flange 32 in which is formed a second ring gear 32a which comprises N2 teeth. The diameter of the second ring gear and its number of teeth are smaller than the equivalent characteristics of the first ring gear; in practice we choose N2=N1−1.

When the eccentric cam makes a complete rotation, the second ring gear has rotated relative to the first ring gear by an angle corresponding to the pitch of one tooth.

The first and second ring gears 31a, 32a are held against each other in a plane-to-plane configuration, perpendicular to the main axis Z1, by means of the presence of a third closure flange 39 welded to the first flange 30 (see FIG. 4). Adjustment mechanisms of the continuous hypocycloid type used in the present disclosure are, for example, described in detail in publication FR2883812. Reference is hereby made to FR2883812 for disclosure relating to continuous hypocycloid adjustments mechanism, which application is hereby incorporated in its entirety.

The first and second ring gears 31a, 32a may be permanently engaged with at least one circle sector under the effect of an eccentric control cam 33. The eccentric control cam is driven by an electric motor 9. Particularly, the eccentric control cam 33 is driven by a drive shaft 38 connected to the motor 9. The drive shaft 38 is centered on the main axis Z1.

Figure 7:
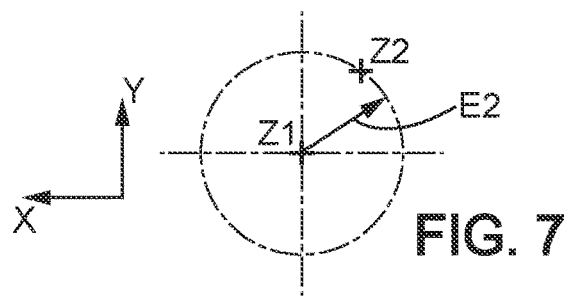
FIG. 7 illustrates the eccentric movement of the axis of the rotating ring relative to the main axis.

In other words, the first and second ring gears form a hypocycloidal interface, where the center of the second rotating ring is displaced with respect to the center of the first ring gear when the control cam 33 rotates. The eccentric movement is illustrated in FIG. 7.

The rotating ring main axis Z2 of the rotating ring remains substantially parallel to the main axis Z1, but changes according to the hypocycloid kinematics of the second ring gears 32a. The offset E2 from the center of the second ring remains limited however, typically <2 mm relative to the main axis.

The rotating ring 2 is formed in the example illustrated here by an upper flange 102 integrally connected to a left side cover 21 and a right side cover 22.

According to the preferred configuration represented, the first flange 31 is rigid with the rotating ring 2. More specifically, the first flange 31 is welded to the upper flange 102 secured to or made rigid with the rotating ring 2 by means of welds S2.

The second flange 32 is rigid with the base 1. More specifically, the second flange 32 is welded to the lower flange 102 forming part of the base by means of welds S1.

However, the reverse assembly is also possible, namely the first flange could be integral to the base while the second flange could be integral to the rotating ring.

The term rotating ring includes any structure/frame/plate intended to pivot relative to a base.

A plurality of rolling elements 5 is provided, interposed between the base and the rotating ring and located at a distance R5 from the main axis Z1.

In the illustrated example, balls are used, but it would also be possible to use rollers, parts of conical shape.

The rolling elements 5, here in the form of balls, are kept at a distance from each other by a ring-shaped guide cage 50 comprising housings for receiving the balls and able to pivot about the main axis Z1. The rotational displacement of the cage 50 is half that of the relative displacement of the rotating ring relative to the base.

As illustrated in FIG. 6, the mounting of the balls 5 allows an eccentric movement of the second flange 102 relative to the first flange 101; in an axial section, a solid line indicates a middle position of the second flange 102 and dashed lines indicate two extreme positions of the second flange 102 (deviation of less than 2 mm from the middle position).

The balls are in contact with the first and second flanges 101, 102 at their upper end 58 and their lower end 57.

An additional retention device 7 is provided to counter the possible occurrence of an accident.

The additional retention device 7 comprises a first part 71 rigid with the base and a second part 72 rigid with the rotating ring 2.

The first part has a hook-shaped cross-section with the end pointing downwards, whereas conversely the second part has a hook-shaped cross-section with the end pointing upwards, and it engages with the complementary shape of the first hook, as can be seen in FIG. 6.

The first and second parts 71,72 extend along an arc portion centered on the main axis Z1 of the arc portion extending angularly over a range between 25° and 35°.

It is therefore understood that around the normal forward-facing position θ=0°, as well as around the other fundamental positions θ=90°, θ=180°, θ=270°, the first and the second retention parts are facing one another and the crash protection is effective.

Furthermore, one will note that it is possible to assemble the pivoting module by positioning the rotating ring at θ=45°, a position where the two retention parts 72 are located in the gaps between the first retention parts 71, and then the upper part can be rotated to finalize the assembly.

The first and second anti-crash parts 71,72 are not in contact with one another within the range of normal forces. It is only in the case where a very strong force is applied to the seat that plastic deformations will appear and the additional retention device will come into play to prevent any dislocation of the seat. In other words, in case of extreme stresses, the first and second parts come into contact with one another to prevent the rising of the rotating ring in the event of an accident to the vehicle.

The first and second parts are arranged at a distance from the axis denoted R7 by at least 200 mm, which forms a very wide seating portion, in other words a distance between the diametrically opposite parts of at least 400 mm.

The pivoting assembly 10 further comprises an electric motor 9 connected to the drive shaft 38 causing the eccentric cam 33 to rotate.

The motor 9 is provided in order to rotate the eccentric cam at the command of a control unit. A manual control may be provided, actuated by the seat occupant, or possibly automatic pre-crash controls for passive safety protection.

Figure 8:
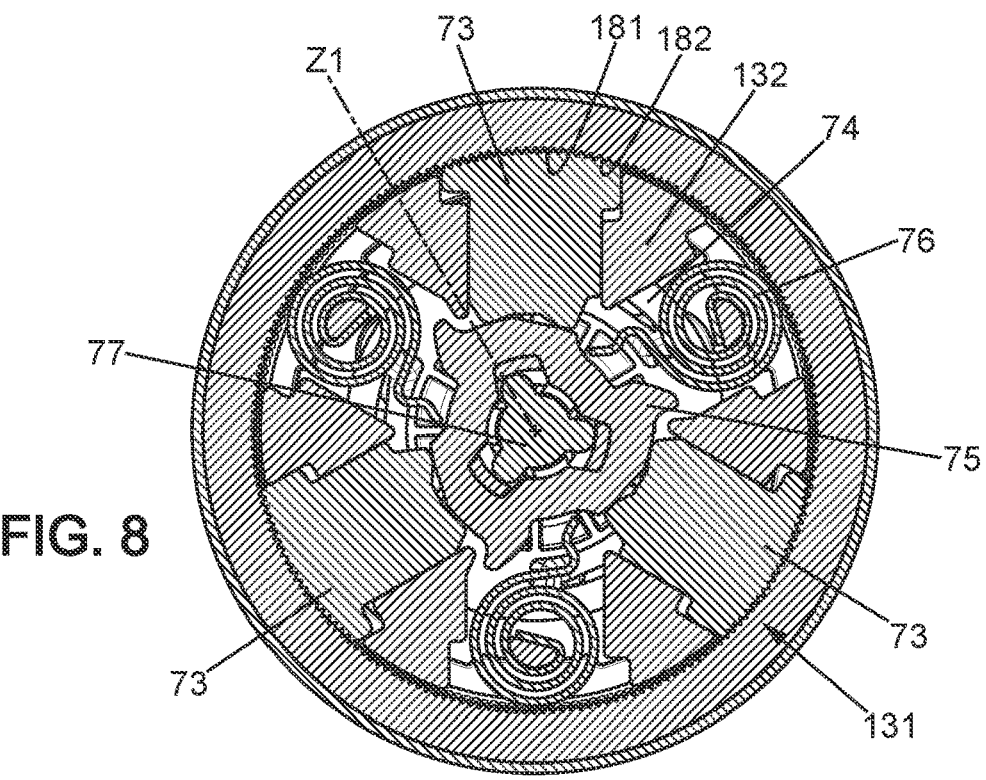
FIG. 8 is a transverse sectional view of the hinge mechanism according to a second embodiment, of the discontinuous type with locking toothed parts.

According to a second embodiment, with reference to FIG. 8, the hinge mechanism is of the discontinuous type with locking toothed parts. In this case, there is provided an operating member 98 accessible by the seat occupant for unlocking the angular pivoting position when necessary. The operating member 98 may be arranged on the side of the seating portion of the seat for example; other positions are also possible. Discontinuous type adjustment mechanisms used in the present disclosure are, for example, described in detail in publication FR2956623. Reference is hereby made to FR2956623 for disclosure relating to discontinuous type adjustment mechanisms, which application is hereby incorporated by reference.

To give only the main elements, the first flange 131 comprises radially interior annular teeth 182. This is provided facing the locking parts 73 which have at their outer end an arcuate toothed sector 181 forming a complementary frame. The locking parts are moved in a radial direction between an exterior engagement position and an interior retracted position where the first flange is rotatable relative to the second flange 132. The displacement of the locking parts is controlled by a control cam 75 associated with a mask 74. The cam 75 is arranged to be rotated by a drive shaft 77 centered on main axis Z1. The cam 75 is configured to push the locking parts outward while the mask is configured to pull these parts inward. The springs 76 return the cam and the mask to the position corresponding to locking the hinge.

According to a second embodiment, with reference to FIGS. 9 and 11, the hypocycloid hinge mechanism comprises a transmission based on the Oldham coupling principle, namely a so-called Oldham joint 8. The principle of this transmission is known and therefore only a summary description is given below.

This transmission comprises a driver 81 and a connecting cross 82. The driver 81 is fixed to the first flange 31 of the hinge 3. It comprises pins 87, 88 received in oblong slots 84 of the cross 82 (on diametrically opposite arms 82*a*). These oblong slots 84 thus allow movement along the first direction perpendicular to the rotating ring main axis Z2. In another transverse direction, the two other diametrically opposite arms 82*b* of the cross comprise other oblong slots 85, in which are received pins 28, 29 rigid with the rotating ring 2.

The transmission based on the Oldham coupling principle is interposed between the hinge mechanism and the rotating ring. This transmission makes it possible to compensate for the eccentric movement of the rotating ring main axis Z2 generated by the hypocycloidal continuous hinge mechanism with eccentric cam.

Note that the pivoting assembly as described above can cover an assembly that can be delivered and assembled as a pivoting module, or conversely as an assembly completely integrated into the support structure of the seat.

It is noted that, in both embodiments, namely either for a discontinuous hinge mechanism or for a continuous hinge mechanism, the drive shaft (respectively denoted 77 and 38) is arranged centrally at the center of the seat pivoting assembly. The drive shaft is substantially centered on the main axis Z1.

According to one particular arrangement, when the motor is positioned above a continuous hinge mechanism and is rigid with the rotating ring, the drive shaft 38 is substantially centered on the rotating ring main axis Z2, said axis can be a bit spaced apart from main axis Z1, but less than 3 mm away, and the axis of the control/drive shaft remains parallel to the main axis Z1.

The term rotating ring includes any structure/frame/plate intended to pivot relative to a base.

The abovementioned term pivoting assembly may cover an assembly that can be delivered and assembled as a pivoting module, or conversely as an assembly fully integrated into the supporting structure of the seat.

In addition, in the context of more or less advanced autonomous driving situations using self-driving functions of the vehicle, not only the passengers but also the driver may prefer a position of the seat which is not oriented directly facing the road, and varied and very different seat orientations can prevail inside the passenger compartment.

In addition, seats with a vertical pivoting function may be equipped with an embedded seat belt anchor, sometimes a lower anchor, and sometimes an additional upper anchor, which reinforces the constraints that the mechanical structure must satisfy.

A movement about the vertical axis may have to balance competing desires between comfort and safety requirements. These competing interests have increased to the point that the absence of noise and/or play are decisive criteria in the acceptance of mechanical solutions that could be offered as well as the performance and integrity of the seat and its attachment to the floor in case of impact.

A need has therefore appeared for a vehicle seat with a pivoting function about a vertical axis which at the same time satisfies the requirements of resistance in case of impact and absence of noise and/or play.

Vehicle seat having a pivoting function about a vertical axis, the seat comprising a pivoting assembly (10) with a base (1), a rotating ring (2) mounted on the base by means of a hinge mechanism (3) interposed between the base and the rotating ring, a seating portion frame (4) connected to the rotating ring, directly or via a raising mechanism and/or longitudinal rails, the hinge mechanism allowing rotation, about a vertical main axis (Z1), of the rotating ring relative to the base and preventing any substantial movement in the other degrees of freedom, namely the other two rotations and the three translations in an orthogonal reference system, the hinge mechanism having at least one rest state in which it rotationally immobilizes the rotating ring in a non-reversible manner relative to the base, the hinge mechanism comprising a first ring gear (31*a*; 181) rigid with the base and a second part having a toothed sector (32*a*; 182), connected to the rotating ring, engaged in the rest state with the first ring gear, the hinge mechanism allowing or driving, when so controlled, an angular displacement of the rotating ring relative to the base.

The invention claimed is:

1. A vehicle seat having a pivoting function about a vertical main axis, the vehicle seat comprising a pivoting assembly which comprises:
    a base configured to be connected to the floor of the vehicle directly or via longitudinal rails,
    a rotating ring mounted on the base by a hinge mechanism interposed between the base and the rotating ring,
    the seat further comprising a seating portion frame connected to the rotating ring, directly or via a raising mechanism and/or longitudinal rails,
    the hinge mechanism allowing rotation of the rotating ring relative to the base about the vertical main axis and blocking any substantial movement in the other degrees of freedom, namely the other two rotations and the three translations in an orthogonal reference system,
    wherein the hinge mechanism is mounted in a central area of the base, the hinge mechanism having at least one rest state in which it rotationally immobilizes the rotating ring relative to the base, the hinge mechanism comprising a first ring gear integral to one of the elements selected among the base and the rotating ring, and at least one second part having a toothed sector, connected to the other of the elements selected among the base and the rotating ring, which in the rest state is engaged with the first ring gear, the hinge mechanism allowing or driving, when so controlled by means of a drive shaft centered on the main axis, an angular displacement of the rotating ring relative to the base and in which a possible angular deflection is at least equal to about 90°, and in which the hinge mechanism is entirely contained in a cylinder about 120 mm in diameter centered on the main axis.

2. The vehicle seat of claim 1, wherein there is further provided an annular guide device with a plurality of rolling elements interposed between the base and the rotating ring and located at a distance from the main axis.

3. The vehicle seat of claim 2, wherein the rolling elements are balls.

4. The vehicle seat of claim 1, wherein the hinge mechanism is of a hypocycloid continuous type with eccentric cam, and the pivoting assembly further comprises an electric motor connected to the eccentric cam and configured for selectively rotating the eccentric cam.

5. The vehicle seat of claim 4, wherein the motor is positioned above the hinge mechanism and is rigid with the rotating ring.

6. The vehicle seat of claim 1, wherein the hinge mechanism comprises a first flange in which is formed the first ring gear which comprises first teeth and a second flange in which is formed a second ring gear which comprises second teeth, the first and second ring gears being constantly engaged with at least one circle sector due to the effect of an eccentric control cam, the first and second ring gears forming a hypocycloid interface in which the center of the second rotating ring is displaced relative to the center of the first ring gear when the control cam rotates.

7. The vehicle seat of claim 6, wherein an Oldham coupling principle based transmission is provided to compensate for an eccentric effect generated by the hypocycloid continuous hinge mechanism with eccentric cam, the Oldham coupling principle based transmission being interposed between the hinge mechanism and the rotating ring.

8. The vehicle seat of claim 6, wherein the hinge mechanism is non-reversible, in other words a large torque exerted between the first and second flanges cannot cause a relative movement of the first flange to the second flange, in an absence of rotation of the eccentric cam caused by rotation of the motor.

9. The vehicle seat of claim 1, wherein the hinge mechanism is of a discontinuous type with locking toothed parts, the seat then comprising an unlocking control lever that is operable by a user of the seat.

10. The vehicle seat of claim 9, wherein the hinge mechanism comprises a first flange in which is formed the first ring gear and a second flange in which are arranged guides adapted to receive and guide locking parts, the locking parts each having teeth which engage with the first ring gear in the rest state of the hinge mechanism and which are distanced from the first ring gear in the activated unlocked state of the hinge mechanism.

11. The vehicle seat of claim 1, further comprising an additional retention device with a first part integral to the base and a second part integral to the rotating ring, the first and second parts coming into contact with each other to prevent the rotating ring from rising in an event of an accident to the vehicle, the first and second parts being arranged at a distance from the main axis of at least about 200 mm.

12. A vehicle seat having a pivoting function about a vertical main axis, the vehicle seat comprising a pivoting assembly which comprises:
- a base configured to be connected to the floor of the vehicle directly or via longitudinal rails,
- a rotating ring mounted on the base by means of a hinge mechanism interposed between the base and the rotating ring,
- the seat further comprising a seating portion frame connected to the rotating ring, directly or via a raising mechanism and/or longitudinal rails,
- the hinge mechanism allowing rotation of the rotating ring relative to the base about the vertical main axis and preventing any substantial movement in the other degrees of freedom, namely the other two rotations and the three translations in an orthogonal reference system,
- wherein the hinge mechanism is mounted in a central area of the base, the hinge mechanism having at least one rest state in which it rotationally immobilizes the rotating ring relative to the base, the hinge mechanism comprising a first ring gear integral to one of the elements selected among the base and the rotating ring, and at least one second part having a toothed sector, connected to the other of the elements selected among the base and the rotating ring, which in the rest state is engaged with the first ring gear, the hinge mechanism allowing or driving, when so controlled by means of a drive shaft centered on the main axis, an angular displacement of the rotating ring relative to the base and in which a possible angular deflection is at least equal to about 90°, and in which the hinge mechanism comprises a drive shaft centered on the main axis.

* * * * *